Figure 1:
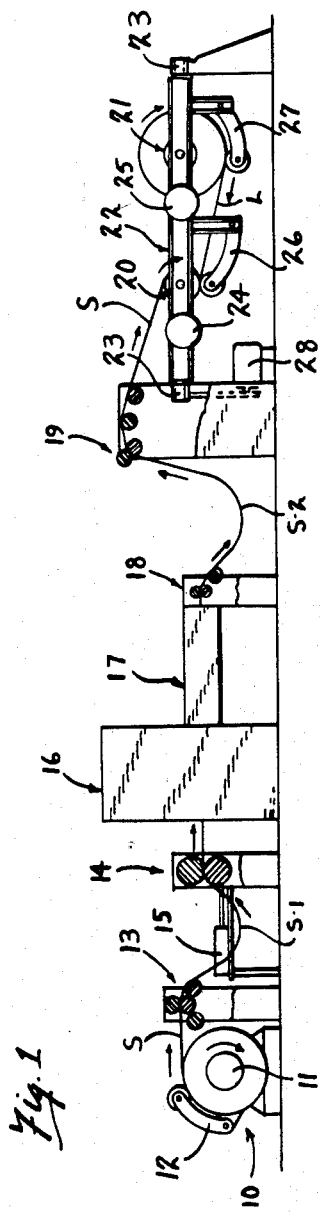

Dec. 10, 1963   R. W. HERR   3,113,741
STRIP HANDLING
Original Filed June 17, 1959   2 Sheets-Sheet 1

INVENTOR.
RICHARD W. HERR
BY
Attorneys

Dec. 10, 1963   R. W. HERR   3,113,741
STRIP HANDLING
Original Filed June 17, 1959   2 Sheets-Sheet 2
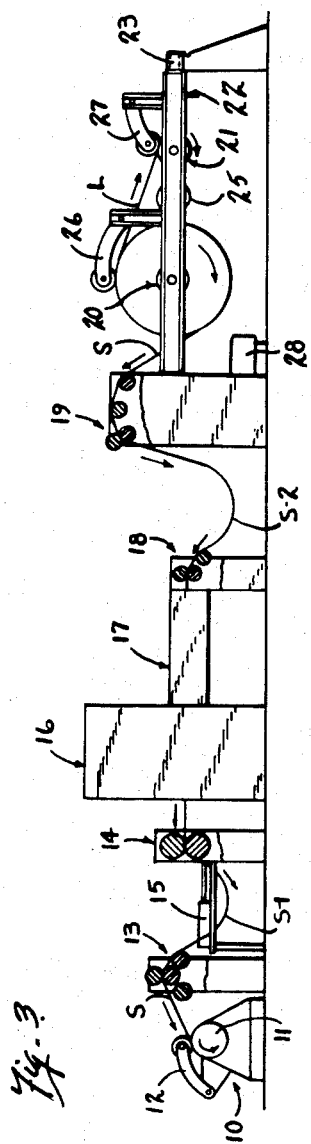
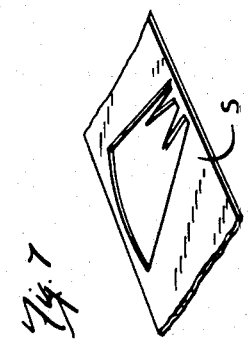
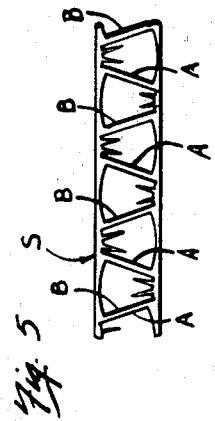
INVENTOR.
RICHARD W. HERR
BY
Attorneys United States Patent Office 3,113,741
Patented Dec. 10, 1963

3,113,741
STRIP HANDLING
Richard W. Herr, Cortland, Ohio, assignor to The Herr Equipment Corporation, Warren, Ohio
Original application June 17, 1959, Ser. No. 821,037, now Patent No. 3,083,926, dated Apr. 2, 1963. Divided and this application June 29, 1962, Ser. No. 206,459
7 Claims. (Cl. 242—56.8)

The present invention relates to strip handling, more particularly to methods of and apparatus for handling strip material during processing thereof, and the principal object of the invention is to provide new and improved methods and apparatus of the character described. This application is a division of application Serial Number 821,037, filed June 17, 1959, entitled Strip Handling, now Patent No. 3,083,926, and assigned to the same assignee as the present case.

In certain strip processing operations, for example, operations wherein pieces are successively blanked from longitudinally spaced strip portions, it is highly desirable from the stand point of scrap reduction that such pieces be blanked from closely spaced successive strip portions. When certain irregularly shaped pieces are being blanked, it is common practise to orient successive pieces in opposite directions to thus reduce scrap losses. This is commonly done by employing a blanking die which simultaneously blanks two closely spaced pieces from the strip, such pieces facing in opposite directions as will be apparent. The strip is then advanced so that the next two pieces are blanked from a strip portion closely spaced from that portion from which the preceding pieces were blanked.

The foregoing prior art solution to the problem is satisfactory for many purposes; however, it has a disadvantage which at times assumes economic consequences of great importance. The prior art solution requires that two blanking dies, or a double blanking die, be employed since two pieces facing in opposite directions must be simultaneously blanked from the strip. The necessity for two dies, or a double die, substantially doubles die costs and since the price of even a simple, single die frequently amounts to several thousand dollars, it will readily be apparent that die costs are considerable.

When long production runs are contemplated, the doubled initial die costs are not of great importance since die life will be doubled over that of a single die and therefore overall dies costs, per piece made, will not be increased. When, however, production runs are limited so that a die will be used for only a fraction of its potential useful life, an entirely different situation is presented. In such case, die life is not a factor and therefore doubled initial die costs spread over a limited number of pieces is an important factor.

The present invention provides methods for the economical high-speed processing of strip material without duplication of costly components whose costs must be spread over relatively short production runs. Other advantages will readily become apparent from a study of the following description and from the drawings appended hereto.

Figure 2:
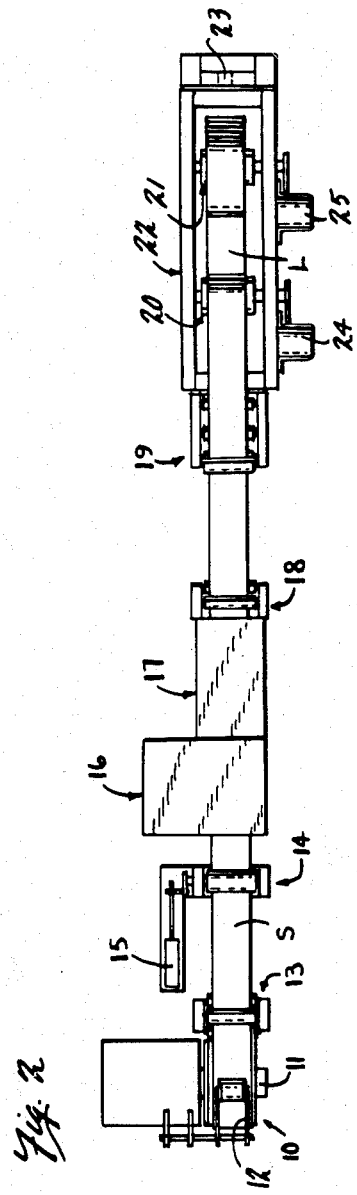

In the drawings accompanying this specificatioin and forming a part of this application there is shown, for purpose of illustration, an embodiment which the invention many assume, and in these drawings:

FIGURE 1 is a side elevational view of a strip processing line embodying the present invention and illustrated in one phase of operation, FIGURE 2 is a top plan view of the line seen in FIGURE 1, FIGURE 3 is a view similar to FIGURE 1 but showing the line in another phase of operation, FIGURES 4 and 5 are fragmentary plan views of the material presently being processed but taken at different phases of the processing operation, FIGURE 6 is an enlarged perspective view of an article presently being made by the instant invention, and FIGURE 7 is a view similar to FIGURE 6 but fragmentarily showing a length of material from which the article seen in FIGURE 6 has been formed.

Referring first to FIGURES 6 and 7, this invention presently contemplates the blanking of members M from strip material S. Although not a part of the present invention, members M are subsequently adapted to be assembled into electrical components. In order to improve the electrical efficiency of the components of which members will become a part, the strip S is formed of a special metal which is quite expensive. Accordingly, the necessity of limiting scrap by obtaining as many pieces M from the strip as possible will be obvious.

Since members M are generally pie-shaped, it will be understood that scrap will be minimized if adjoining pieces are blanked from the strip oriented in opposite directions as seen in FIGURE 5. The method of and apparatus for so blanking the pieces from the strip by the use of but a single blanking die forms the subject matter of the present invention.

Referring now to FIGURE 1, there is shown a reel 10 for rotatably supporting a coil of strip S. This reel may be of conventional form wherein a rotatable, expansible-contractable drum 11 is inserted within the central aperture of the coil and then expanded to tightly grip the inner periphery of the latter. A suitable drive motor or the like (not shown) will be provided for rotating drum 11 at various speeds. A pivotally mounted arm 12 having a roller at its free end is biased to engage the periphery of the coil. This arm automatically adjusts the speed of the reel drive motor through a rheostat or the like to so control the rotational speed of drum 11 that the strip will be unwound from the coil at a constant linear speed despite the changing size of the coil supported on the drum.

From the reel 10, the strip passes in the direction of the arrow between a set of rolls 13 whose rotational speed is controlled by a conventional motor-brake device, not shown, and to a set of feed rolls 14. For a purpose to appear, the strip assumes a loop formation S–1 intermediate the rolls 13, 14. Feed rolls 14 are adapted to be intermittently rotated to feed a predetermined length of strip therebetween by any suitable means; however, at the present time, such rolls are rotated by means of an adjustable stroke fluid cylinder 15 having driving connection with the rolls through a suitable arrangement of a rack, gears and clutches. The arrangement presently employed is shown and described in the patent of Richard F. Herr, Number 2,978,158, issued April 4, 1961, entitled Feed Apparatus; however, any other suitable consrtuction may be employed.

From the feed rolls 14 the strip passes in the direction of the arrow through a conventional press 16 which carries the blanking die (not shown) for forming the piece M from the strip. Associated with the press is a register device 17 which need not be described in detail since it is a commercially available item. Briefly, however, device 17 utilizes a photoelectric cell or the like to sense the position of the hole blanked in the strip by the press to determine whether too much or too little strip has been fed. In accordance with a signal sent by the device 17, the feed rolls will then be rotated a slightly greater amount or a lesser amount at their next operating cycle or at a subsequent opportune time to feed either a longer or a shorter length of strip, depending upon the correction required, to thus insure the successive pieces will be blanked from the strip at precisely the proper longitudinally spaced-apart places.

From the register device 17, the strip passes between roll sets 18 and 19 which are similar to roll set 13 and whose rotation is also controlled by suitable motor-brake devices. For a purpose to appear, the strip assumes a loop formation S–2 intermediate the roll sets 18, 19.

Mounting adjacent the stand which supports the roll set 19 are a pair of reels 20, 21 in side by side, spaced-apart relation. These reels are arranged with their axes in parallel relation and are carried by a frame 22 which is supported at 23 for pivotal movement about an axis extending transversely of the axes of reels 20, 21 and generally aligned with the direction of strip movement. The rotation of each reel 20, 21 is presently controlled by motor-brake units 24, 25 operably connected with respective reels. Each reel may take the form of a rotatably supported drum; however, as will appear, neither drum need be of the expansible-contractable type as is the drum 11 of reel 10.

For a purpose to be disclosed and in the stage of operation seen in FIGURES 1 and 2, drum 21 will carry a coil of strip material L which will hereinafter be referred to as interliner strip material. The free end of the strip L may be permanently secured to reel 20 since such strip in normal operation will merely be transferred back and forth between the reels 20 and 21.

Pivotally carried by frame 22 adjacent reels 20, 21 are arms 26, 27 whose free ends are biased to engagement with the outer peripheries of the coiled strip carried by respective reels 20, 21. Arms 26, 27 function in a manner similar to arm 12 in that each automatically controls the speed of rotation of a respective motor-brake unit 24, 25 in accordance with the size of the coil wound upon a respective reel so that the strip will be wound at constant linear speed despite changes in coil size. For a purpose to appear, a suitable motor unit 28 is operably connected with the frame 22 for rotating the latter about its pivots 23 from the position seen in FIGURE 1 to the position seen in FIGURE 3 and from the last mentioned position to that first mentioned.

As previously disclosed, the free end of strip L will be connected to reel 20 for winding thereon. Additionally, the strip S is also adapted to be wound upon reel 20 following its passage through roll set 19 so that upon rotation of reel 20 in the direction of the arrow, both strip S and strip L will be wound, in alternate layers, upon the reel 20. Accordingly, the free end of strip S may either be attached to the reel 20 by any suitable means or may, if desired, merely be inserted between the reel and the strip L or between adjoining convolutions of strip L so that slight rotation of the reel will serve to clamp the strip S in position.

Assuming that strips S and L are arranged as seen in FIGURE 1, operation will be as follows: Drum 11 of reel 10 will be rotated in the direction of the arrow to continuously unwind strip S from the coil supported by reel 11. Roll set 13 will be continuously rotated in a direction to pass strip to the loop S–1 and at a speed to insure that the strip portion intermediate such roll set and the reel 10 will preferably be lightly tensioned.

Press 16 will then operate to blank a piece from the strip whereupon feed rolls 14 will be rotated a predetermined amount, controlled by the register device 17, to feed a predetermined length of strip to the press. During rotation of the feed rolls, roll set 18 will rotate to draw the strip through the press and to pass it to the strip loop S–2. Upon cessation of rotation of the feed rolls 14 and while the strip portion adjacent the press is stationary, the press will again operate to blank a piece from the strip. The foregoing feeding and blanking operations will automatically alternate until all of the strip wound upon reel 10 has been passed through the press.

During the intermittent operation of the press and feed rolls, coiler 20 has been continuously rotated by its motor unit 24 in the direction of the arrow so as to wind both strips S and L thereon in alternate layers. Roll set 19 at this time functions as a brake to maintain a slight tension on the strip portion between such roll set and the coiler 20. Additionally, motor-brake unit 25 of coiler 21 also functions as a brake to maintain a tension on the strip L.

Since reels 10 and 20 operate to continually pass strip while the latter moves but intermittently through the press, the strip loops S–1 and S–2 thus permit the strip to be momentarily fed into the loops at a faster rate than that at which the strip is withdrawn therefrom and to permit the strip to be momentarily withdrawn from the loops at a faster rate than at which it is fed thereinto. Accordingly, each strip loop will alternately increase and decrease in size during line operation.

It is to be understood that the function of strip L is to separate the windings of strip S coiled upon reel 20 so that such windings will not become entangled with each other and thus render difficult the subsequent unwinding of the strip S. It will readily be apparent that if strip blanked as seen in FIGURES 4 and 7 were wound in a coil without the strip L as a separator, the sharp edges resulting from the blanking operation aforesaid would catch upon one another and thus subsequent unwinding of the coil would likely damage the strip and render further operations thereon difficult if not impossible.

When all of the strip has been unwound from reel 10, passed through the press 16 and wound upon reel 20, operations will be suspended. At this time, the strip S appears as illustrated in FIGURE 4 with every other piece blanked therefrom, the punched holes remaining in the strip S after this first phase of operation being indicated at A. An operator will now actuate motor 28 to rotate frame 22 one hundred eighty degrees about its pivots 23 from the position seen in FIGURE 1 to the position seen in FIGURE 3. The end of strip S projecting from the coil on reel 20 will once again be threaded through the rolls 19, 18, register device 17, press 16, feed rolls 14, rolls 13, and such strip end then attached to the reel drum 11.

Reel 21 will now be rotated by its motor 25 in the direction of the arrow to wind the strip L thereon and to thus cause rotation of reel 20 in the direction of the arrow to unwind both strips S and L therefrom. At this time, motor-brake unit 24 of reel 20 functions as a brake to maintain a tension on both strips since roll set 19 is at this time being rotated in a direction to feed strip S from the reel 20 to the strip loop S–2 and thence to the roll set 18. The latter is, during this phase of the operation, functioning as a brake to maintain a tension on strip S as it is being intermittently pulled through the press 16 by the feed rolls 14 which are now feeding from right to left, in the position of parts shown, rather than from left to right, as was the case during the previously described phase of operation. Reel drum 11 will be rotated in the direction of the arrow to wind the strip S thereon while rolls 13 will at this time function as a brake to tension the strip portion between the reel 10 and the rolls 13. Intermittent the feeding operations of the feed rolls 14, press 15 will, as previously disclosed, operate to blank a piece from the strip S. These pieces will be blanked from the strip S intermediate the places where the blanks were punched from the strip during the first phase of operation. This is clearly illustrated in FIGURE 5 wherein the holes remaining in the strip after the first phase of operation are indicated at A (but oriented in the opposite direction from that seen in FIGURE 4 since the strip has been turned side for side by the rotation aforesaid of frame 22) and wherein the holes remaining after the second phase of operation are indicated at B.

When all of the strip S has been unwound from reel 20, passed through the press 16 and wound upon the reel 10, operations will be suspended. The skeletal strip coil on reel 10 will now be removed and scrapped, such removal being facilitated by collapsing reel drum 11, and a fresh coil of strip substituted therefor. Motor 28 will again be operated to rotate frame 22 from the position seen in FIGURE 3 to the position seen in FIGURE 1 whereupon another first phase of operations may begin as soon as the strip is threaded through the various parts as seen in FIGURE 1.

In view of the foregoing, it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. The method of blanking pieces from strip material which comprises unwinding the material from a coil at a substantially constant rate, intermittently feeding the unwound material to a blanking device, intermittently actuating the blanking device while the material is at rest thereadjacent to blank a piece therefrom, winding the blanked material into a second coil at a substantially constant rate, simultaneously unwinding a second strip of material from a storage coil and winding it into such second coil to separate adjoining convolutions of the first mentioned material, simultaneously turning said second coil and said storage coil end-for-end, unwinding the first and second mentioned materials from the second coil at a substantially constant rate, simultaneously rewinding the second strip of material into the storage coil, intermittently feeding the first mentioned material once again to the blanking device, intermittently actuating the blanking device while the material thereadjacent is at rest to blank a piece therefrom intermediate the places initially blanked, and winding the first mentioned material into a coil at a substantially constant rate following its second passage through the blanking device.

2. The method of blanking pieces from strip material which comprises unwinding the material from a coil and feeding the unwound material to a blanking device, blanking pieces successively from the unwound strip material from longitudinally spaced places therealong as such material passes through the blanking device, winding the material into a second coil following its passage through the blanking device, unwinding the material from said second coil and feeding it once again to the blanking device, blanking pieces successively from the unwound strip material at places intermediate those previously blanked, and turning the strip material side-for-side prior to the aforesaid second-mentioned feeding thereof.

3. The method of claim 2 wherein the turning of said strip material side-for-side is effectuated by turning said second coil end-for-end.

4. The method of claim 2 and comprising the additional steps of simultaneously winding a second strip of material into said second coil to separate adjoining convolutions of said first-mentioned strip material and separating said second strip material and said first-mentioned strip material prior to feeding of the latter once again to said blanking device.

5. The method of claim 4 wherein the turning of said first-mentioned strip material side-for-side is effectuated by turning said second coil end-for-end.

6. The method of claim 4 and comprising the additional steps of unwinding said second strip material from a storage coil during winding of said second coil and rewinding said second strip material onto said storage coil during unwinding of said second coil.

7. The method of claim 6 wherein both said storage coil and said second coil are turned end-for-end prior to unwinding of the latter to effectuate the foresaid side-for-side turning of said first-mentioned strip material.

References Cited in the file of this patent

UNITED STATES PATENTS

| 1,742,967 | Patterson | Jan. 7, 1930 |
| 2,658,691 | Mallory | Nov. 10, 1953 |
| 2,658,693 | Wolf | Nov. 10, 1953 |
| 2,758,036 | Cyr | Aug. 7, 1956 |
| 2,837,159 | Herr | June 3, 1958 |
| 2,914,422 | Pratt et al. | Nov. 24, 1959 |
| 2,933,002 | Giboney | Apr. 19, 1960 |
| 2,961,342 | Snyder | Nov. 22, 1960 |